US010809174B2

(12) United States Patent
Velge et al.

(10) Patent No.: US 10,809,174 B2
(45) Date of Patent: Oct. 20, 2020

(54) PARTICULATE MATTER MEASURING APPARATUS

(71) Applicant: Pinssar Holdings Pty Ltd, Brisbane, Queensland (AU)

(72) Inventors: Francois Velge, Brisbane (AU); Peter Knott, Brisbane (AU)

(73) Assignee: Pinssar Holdings Pty Ltd, Brisbane, Queensland (AU)

( * ) Notice: Subject to any disclaimer, the term of this patent is extended or adjusted under 35 U.S.C. 154(b) by 55 days.

(21) Appl. No.: 16/310,396

(22) PCT Filed: Jun. 14, 2017

(86) PCT No.: PCT/AU2017/050595
§ 371 (c)(1),
(2) Date: Dec. 14, 2018

(87) PCT Pub. No.: WO2017/214672
PCT Pub. Date: Dec. 21, 2017

(65) Prior Publication Data
US 2019/0339185 A1 Nov. 7, 2019

(30) Foreign Application Priority Data

Jun. 14, 2016 (AU) ................................ 2016902308

(51) Int. Cl.
*G01N 15/06* (2006.01)
*G01N 1/22* (2006.01)
(52) U.S. Cl.
CPC .......... *G01N 15/06* (2013.01); *G01N 1/2211* (2013.01); *G01N 2015/0693* (2013.01)

(58) Field of Classification Search
CPC ..... G01N 2001/2223; G01N 2030/027; G01N 2030/067; G01N 2030/628;
(Continued)

(56) References Cited

U.S. PATENT DOCUMENTS

| 7,390,339 B1* | 6/2008 | Warrick ................. B01D 45/12 55/346 |
| 2007/0068223 A1* | 3/2007 | Chen ..................... G01N 1/2211 73/30.01 |

(Continued)

OTHER PUBLICATIONS

Yan, Thomas, Authorized Officer, Australian Patent Office, "International Search Report" in connection with related International Application No. PCT/AU2017/050595, dated Sep. 12, 2017, 5 pages.

(Continued)

*Primary Examiner* — Michael P Stafira
(74) *Attorney, Agent, or Firm* — Kolisch Hartwell, P.C.

(57) ABSTRACT

A particulate matter measuring apparatus including an inlet for introducing air, a cyclone means fluidly connected to the inlet, the cyclone means adapted to remove particles of a predetermined size from the air, a particle detector to detect particulate matter in the air and a pump to move the air from the inlet, through the cyclone means and through the particle detector, wherein the particle detector has a laser diode to shine laser light through the air and a detector angled at between 115° to 140° relative to the direction of the laser light to detect an amount of laser light scattered by particulate matter in the air.

23 Claims, 5 Drawing Sheets

(58) Field of Classification Search
CPC ... G01N 2030/8804; G01N 2030/8813; G01N 27/62; G01N 30/06; G01N 30/16; G01N 30/72; G01N 30/7233; G01N 30/8658; G01N 30/88; G01N 35/00871; G01N 35/0092; G01N 35/026; G01N 35/08; G01N 15/0255; G01N 2001/002; G01N 1/221; G01N 2333/195; G01N 2405/00; G01N 2405/04; G01N 2405/08; G01N 2570/00; G01N 27/622; G01N 27/624; G01N 2800/26; G01N 30/724; G01N 33/487; G01N 33/48735; G01N 33/6848; G01N 33/6851; G01N 33/92; G01N 3/00; G01N 9/00; G01N 15/0612; G01N 15/0625; G01N 15/0637; G01N 1/2205; G01N 1/26; G01N 1/405; G01N 2001/021; G01N 2001/2276; G01N 2001/2833; G01N 2015/0026; G01N 2015/0288; G01N 2015/0693; G01N 2021/4726; G01N 21/53; G01N 21/64; G01N 21/6486; G01N 33/497; G01N 35/00009; G01N 2500/04; G01N 33/5032; G01N 1/2211; G01N 1/2208; G01N 2015/0088; G01N 2333/4703; G01N 33/6872; G01N 15/0266; G01N 15/06; G01N 15/0606; G01N 15/1459; G01N 1/2202; G01N 1/28; G01N 2001/383; G01N 2015/006; G01N 2015/0038; G01N 2015/0046; G01N 2015/0096; G01N 2015/0261; G01N 2021/6439; G01N 21/6428; G01N 33/582; G01N 1/22; G01N 1/2214; G01N 1/2273; G01N 1/24; G01N 1/38; G01N 1/4055; G01N 2001/022; G01N 2001/2217; G01N 2001/2279; G01N 2001/2285; G01N 2015/1481; G01N 2030/743; G01N 2030/8494; G01N 21/553; G01N 21/65; G01N 21/658; G01N 21/718; G01N 30/84; G01N 33/0009; G01N 33/15; G01N 33/54313; G01N 33/54366; G01N 33/54386; G01N 33/54393; G01N 33/56983
See application file for complete search history.

(56) References Cited

U.S. PATENT DOCUMENTS

| | | | | |
|---|---|---|---|---|
| 2008/0148812 A1* | 6/2008 | Wei | | G01N 1/2252 73/23.31 |
| 2010/0255560 A1* | 10/2010 | Call | | C12M 45/22 435/243 |
| 2010/0288921 A1* | 11/2010 | Wang | | G01N 15/0205 250/287 |
| 2011/0159596 A1* | 6/2011 | Keinan | | G01N 1/2211 436/52 |
| 2015/0136975 A1* | 5/2015 | Sugaya | | H01J 49/0422 250/288 |

OTHER PUBLICATIONS

Yan, Thomas, Authorized Officer, Australian Patent Office, "Written Opinion of the International Searching Authority" in connection with related International Application No. PCT/AU2017/050595, dated Sep. 12, 2017, 5 pages.

Yan, Thomas, Authorized Officer, Australian Patent Office, "Written Opinion of the International Preliminary Examining Authority" in connection with related International Application No. PCT/AU2017/050595, dated May 30, 2018, 5 pages.

Yan, Thomas, Authorized Officer, Australian Patent Office, "International Preliminary Report on Patentability" in aonnection with related International Application No. PCT/AU2017/050595, dated Aug. 23, 2018, 15 pages.

* cited by examiner

PARTICULATE MATTER MEASURING APPARATUS

FIELD OF INVENTION

The present invention relates to a particulate matter measuring apparatus. The present invention has particular but not exclusive application for a diesel particulate matter measuring apparatus. Reference will be made in the specification to use of the invention in mines and mining environments. This use is by way of example only and the invention is not limited to this use.

BACKGROUND OF THE INVENTION

Particulate matter measuring devices are used to measure the amount of certain particulates that are present in air.

In mining scenarios as an example, a sample of air can be passed through a filter of a measuring device, the filter is then removed and analysed in a laboratory to determine the amount of particulates in the air sample. Such an approach is robust and provides statistically reliable estimates of exposure of a group of mine workers to particulate matter. One downside is the time taken to obtain exposure results and the effectiveness of subsequent efforts to address controls in the event of individual results exceeding exposure standards. This is particularly difficult in many mining scenarios where the configuration of the working environment and conditions can change daily or even hourly. Batch analysis of air samples do not provide real time results.

Electronic particle detectors are used to provide real-time monitoring of particulate matter. These electronic particle detectors require larger particles such as dust particles to be filtered out so that only particles of interest, for example respirable particles of a size that pose potential health risks, are detected. Electronic particle detectors use particle impactors to catch particles of a larger size on collection plates, whereas, particles of the desired size and smaller pass through the particle impactors. These particle impactors reliably filter out larger particles but require regular maintenance so that they do not clog with dust and other larger particles. Such electronic particle detectors cannot provide continuous monitoring of the air.

OBJECT OF THE INVENTION

It is an object of the present invention to overcome or at least alleviate one or more of the above problems with particulate matter measuring devices and/or provide the consumer with a useful or commercial choice.

SUMMARY OF THE INVENTION

In one aspect the present invention broadly resides in a method of measuring particulate matter in air, the method including the steps of:

introducing air into a particulate matter measuring apparatus, said particulate matter measuring apparatus includes a cyclone means and a particle detector;

removing particles of a predetermined size from the air using the cyclone means; and detecting particulate matter in the air after it has left the cyclone means by using the particle detector.

Preferably the step of removing particles of a predetermined size from the air using a cyclone means involves removing particles larger than 1 µm. Preferably the step of removing particles of a predetermined size from the air using a cyclone means involves removing particles larger than 0.9 µm. More preferably the step of removing particles of a predetermined size from the air using a cyclone means involves removing particles larger than 0.8 µm.

Preferably the method further includes the step of moving the air through the cyclone means and through the particle detector using a pump. Preferably the pump is a vacuum pump. It will be understood that the pump may also be a blower capable of producing a vacuum.

Preferably the method further includes measuring the flow rate of the air. More preferably the flow rate of the air leaving the cyclone means is measured.

Preferably the method further includes the step of controlling the pump to achieve a predetermined flow rate of the air. Preferably the pump is controlled dependent on the measurement of the flow rate of the air. Preferably the predetermined flow rate of the air is between 0.5 and 3 L/min. Preferably the predetermined flow rate of the air is between 1.8 and 2.5 L/min. More preferably the predetermined flow rate is about 2.2 L/min.

Preferably the method further includes the step of heating the air that has left the cyclone means. Typically, heating the air that has left the cyclone means results in minimising the influence of humidity in the air on the particle detector. Preferably the method further includes measuring the temperature of the air. Preferably a heater heats the air. Preferably the heater heats the air to between 46 and 66 degrees Celsius. Preferably the heater heats the air to between 52 and 60 degrees Celsius. More preferably the heater heats the air to about 56 degrees Celsius. Preferably the heater is controlled dependent on the measured temperature of the air.

Preferably the method further includes the step of varying the flow rate of the air to remove at least some of the particles of a predetermined size from the cyclone means.

Preferably the method further includes the step of introducing filtered air into the particulate matter measuring apparatus. Preferably the filtered air has substantially all particulate matter that can be detected by the particle detector removed. Preferably the filtered air has particulate matter larger than 10 nm removed. Preferably the filtered air is heated. Preferably the filtered air is heated to the same temperature as the air leaving the cyclone means to minimising the influence of humidity in the air on the particle detector. Preferably the filtered air is moved through the particle detector to produce a 'zero' reading. Preferably the method further includes the step of utilising the 'zero' reading to correct the amount of detected particulate matter in the air. Preferably the method further includes the step of controlling a valve to select between air leaving the cyclone means and filtered air.

Preferably the step of detecting particulate matter in the air after it has left the cyclone means by using a particle detector involves detecting the particulate matter when the measured air temperature is at a predetermined temperature and the measured air flow is at a predetermined level.

Preferably the step of detecting particulate matter in the air after it has left the cyclone means by using a particle detector involves detecting diesel particulate matter.

Preferably the step of detecting particulate matter in the air after it has left the cyclone means by using a particle detector involves shinning a laser light through the air as it is passing through the particle detector. Preferably the step of detecting particulate matter in the air after it has left the cyclone means by using a particle detector involves using a laser light scattering photometry particle detector. Preferably the laser light used in the laser light scattering photometry particle detector has a wavelength of substantially 624 nm.

Preferably the step of detecting particulate matter in the air after it has left the cyclone means further involves detecting the scattered laser light at between 115° to 140° relative to an axis extending in the direction of the laser light. More preferably the step of detecting particulate matter in the air after it has left the cyclone means further involves detecting the scattered laser light at substantially 135° relative to an axis extending in the direction of the laser light. Preferably the detector in the laser light scattering photometry particle detector is angled at between 115° to 140° relative to an axis extending in the direction of the laser light. More preferably the detector in the laser light scattering photometry particle detector is angled at substantially 135° relative to an axis extending in the direction of the laser light. Preferably the detector in the laser light scattering photometry particle detector is angled at substantially 90° relative to an axis extending in the direction of the flow of air. Typically, the detected scattered laser light correlates to an amount of particulate matter in the air.

Preferably the step of detecting particulate matter in the air after it has left the cyclone means by using a particle detector involves detecting the particulate matter at predetermined intervals. Preferably the step of detecting particulate matter in the air after it has left the cyclone means by using a particle detector involves detecting the particulate matter for predetermined time periods.

Preferably the method further includes the step of exhausting the air from the particulate matter measuring apparatus after the air has left the particle detector. Preferably the method further includes the step of exhausting the filtered air from the particulate matter measuring apparatus after the filtered air has left the particle detector.

Preferably the method further includes the step of measuring the pressure within a casing of the particulate matter measuring apparatus. Preferably the method further includes the step of utilising the pressure reading to correct the amount of detected particulate matter in the air.

Preferably the step of measuring the pressure further includes equalising the pressure between the inside of the casing and the outside of the casing. Preferably the pressure is equalised using a pressure relief valve.

Preferably the method further includes the step of communicating an amount of detected particulate matter to a remote server.

Preferably the method further includes the step of communicating an amount of measured temperature of the air to a remote server.

Preferably the method further includes the step of communicating an amount of measured flow rate of the air to a remote server.

Preferably the method further includes the step of communicating a measured 'zero' reading to a remote server.

In another aspect the present invention broadly resides in a particulate matter measuring apparatus including:
an inlet for introducing air;
a cyclone means fluidly connected to the inlet, the cyclone means adapted to remove particles of a predetermined size from the air;
a particle detector to detect particulate matter in the air; and
a pump to move the air from the inlet, through the cyclone means and through the particle detector.

Preferably the cyclone means is adapted to remove particles greater than 1 μm from the air. Preferably the cyclone means is adapted to remove particles greater than 0.9 μm from the air. Preferably the cyclone means is adapted to remove particles greater than 0.8 μm from the air. More preferably the cyclone means has a cut point of 0.8 μm at an air flow rate of 2.2 L/min. Preferably the cyclone means has an inlet. Preferably the cyclone means inlet is fluidly connected to the inlet of the particulate matter measuring apparatus. Alternatively, the inlet of the particulate matter measuring apparatus may be part of the cyclone means. Preferably the cyclone means has an outlet. Preferably the cyclone means comprises a cyclone body. Preferably the cyclone means includes a dust cup for collection of the particles of a predetermined size that have been removed from the air.

Preferably the particle detector is an electronic particle detector. More preferably the particle detector is a laser light scattering photometry particle detector. Preferably the particle detector has a laser diode to produce laser light. Preferably in use, the laser light is shone through the air as the air moves through the particle detector. Preferably the particle detector has a light trap to trap any laser light that is not scattered by particulate matter. Preferably the particle detector has a detector that detects an amount of laser light scattered by particulate matter. Preferably the laser light used in the particle detector has a wavelength of 624 nm. Preferably the detector in the particle detector is angled at between 115° to 140° relative to the direction of the laser light. More preferably the detector in the particle detector is angled at substantially 135° relative to the direction of the laser light. Preferably the detector in the particle detector is angled at substantially 90° relative to an axis extending in the direction of the flow of air. In a preferred embodiment, the particle detector has a laser diode to shine laser light through the air and a detector angled at substantially 135° relative to the direction of the laser light to detect an amount of laser light scattered by particulate matter in the air.

Preferably the pump is a vacuum pump. More preferably the pump is a centrifugal pump.

Preferably the particulate matter measuring apparatus further includes a flow rate sensor to measure the flow rate of the air. Preferably the flow rate sensor is fluidly connected between the cyclone means and the particle detector.

Preferably the particulate matter measuring apparatus further includes a heater to heat the air. Preferably the heater is located between the cyclone means and the particle detector.

Preferably the particulate matter measuring apparatus further includes a temperature sensor to measure the temperature of the air. Preferably the temperature sensor is located between the cyclone means and the particle detector. More preferably the temperature sensor is located between the heater and the particle detector.

Preferably the particulate matter measuring apparatus further includes a filter for introducing filtered air. Preferably the filter is fluidly connected to the particle detector. Preferably the filter is adapted to filter out particles larger than 1 nm. Preferably the filter is a two stage, sintered metal and borosilicate glass fibre filter.

Preferably the particulate matter measuring apparatus further includes a regulator to regulate the air and the filtered air entering the particle detector. Preferably the regulator is a valve. More preferably, the regulator is a pinch valve. Preferably the regulator is adapted to alternate between the air and the filtered air.

Preferably the particulate matter measuring apparatus further includes an exhaust to exhaust air from the pump. Preferably the exhaust includes a one-way exhaust valve. Preferably the exhaust exhausts air from the pump to a location external to the particulate matter measuring apparatus.

Preferably the particle detector is fluidly connected to the cyclone means. Preferably the particle detector is fluidly connected to the cyclone means by at least one tube. Preferably the particle detector is fluidly connected to the pump. Preferably the particle detector is fluidly connected to the pump by at least one tube. Preferably the filter is fluidly connected to the particle detector by at least one tube. Preferably the tubing (e.g. the at least one tube fluidly connecting the particle detector to the cyclone means, the at least one tube fluidly connecting the particle detector to the pump, etc.) is flexible tubing. Preferably the tubing has an internal diameter of 3.5 to 5 mm. Preferably the tubing has an internal diameter of 4 to 4.5 mm. More preferably, the tubing has an internal diameter of about 4.3 mm.

Preferably the particulate matter measuring apparatus further includes a computer processing unit (CPU). Preferably the CPU is adapted to control the pump. Preferably the CPU is adapted to monitor the particle detector. Preferably the CPU is adapted to monitor the temperature sensor. Preferably the CPU is adapted to control the heater. More preferably the CPU is adapted to control the heater based on readings from the temperature sensor. Preferably the CPU is adapted to monitor the flow rate sensor. More preferably the CPU is adapted to control the pump based on readings from the flow rate sensor. Preferably the CPU is adapted to control the regulator. For example, the regulator may be controlled by the CPU to switch between air from the cyclone means being supplied to the particle detector and filtered air from the filter being supplied to the particle detector.

Preferably the particulate matter measuring apparatus further includes one or more communication devices. Preferably the one or more communication devices are operatively connected to the CPU. Preferably the one or more communication devices are adapted to enable a connection between the CPU and a remote server. The one or more communication devices may include, but are not limited to, one or more cellular modems, 3g modems, 4g modems, wifi modems, radio transceivers, USB ports, Ethernet ports, or the like, or a combination thereof.

Preferably the particulate matter measuring apparatus further includes a battery to provide power to the particulate matter measuring apparatus. More preferably the particulate matter measuring apparatus further includes a mains connection to provide power to the particulate matter measuring apparatus. In one embodiment, the battery provides power to the particulate matter measuring apparatus if the mains connection fails.

Preferably the particulate matter measuring apparatus further includes a casing. Preferably the casing is dust tight. Preferably the inlet is in fluid communication with an area outside of the casing. Preferably the filter is in fluid communication with an area outside of the casing. Preferably the exhaust is in fluid communication with an area outside of the casing.

Preferably the particulate matter measuring apparatus further includes a pressure relief valve. Preferably the pressure relief valve is in fluid communication with an area inside of the casing and an area outside of the casing. Preferably the pressure relief valve is adapted to equalise the pressure between the outside of the casing and the inside of the casing.

Preferably the particulate matter measuring apparatus further includes a pressure sensor. Preferably the pressure sensor detects the pressure within the casing. Preferably the detected pressure from the pressure sensor is used to correct the amount of detected particulate matter in the air.

In a further aspect, the present invention broadly resides in a method of measuring particulate matter in air using a particulate matter measuring apparatus as described above.

In another aspect, the present invention broadly resides in a particulate matter measuring apparatus as described above including:
    an inlet for introducing air;
    a cyclone means fluidly connected to the inlet, the cyclone means adapted to remove particles of a predetermined size from the air;
    a particle detector to detect particulate matter in the air; and
    a pump to move the air from the inlet, through the cyclone means and through the particle detector,
    wherein air is introducing into the particulate matter measuring apparatus, particles of a predetermined size are removed from the introduced air using the cyclone means and particulate matter in the air is detected after it has left the cyclone means by the particle detector.

Preferably the particulate matter is diesel particulate matter. More preferably, the particulate matter measuring apparatus is a diesel particulate matter measuring apparatus. Preferably the diesel particulate matter measuring apparatus is used in an underground mining environment. Preferably the cyclone means removes larger non-diesel particles from the air.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENT

Figure 1:
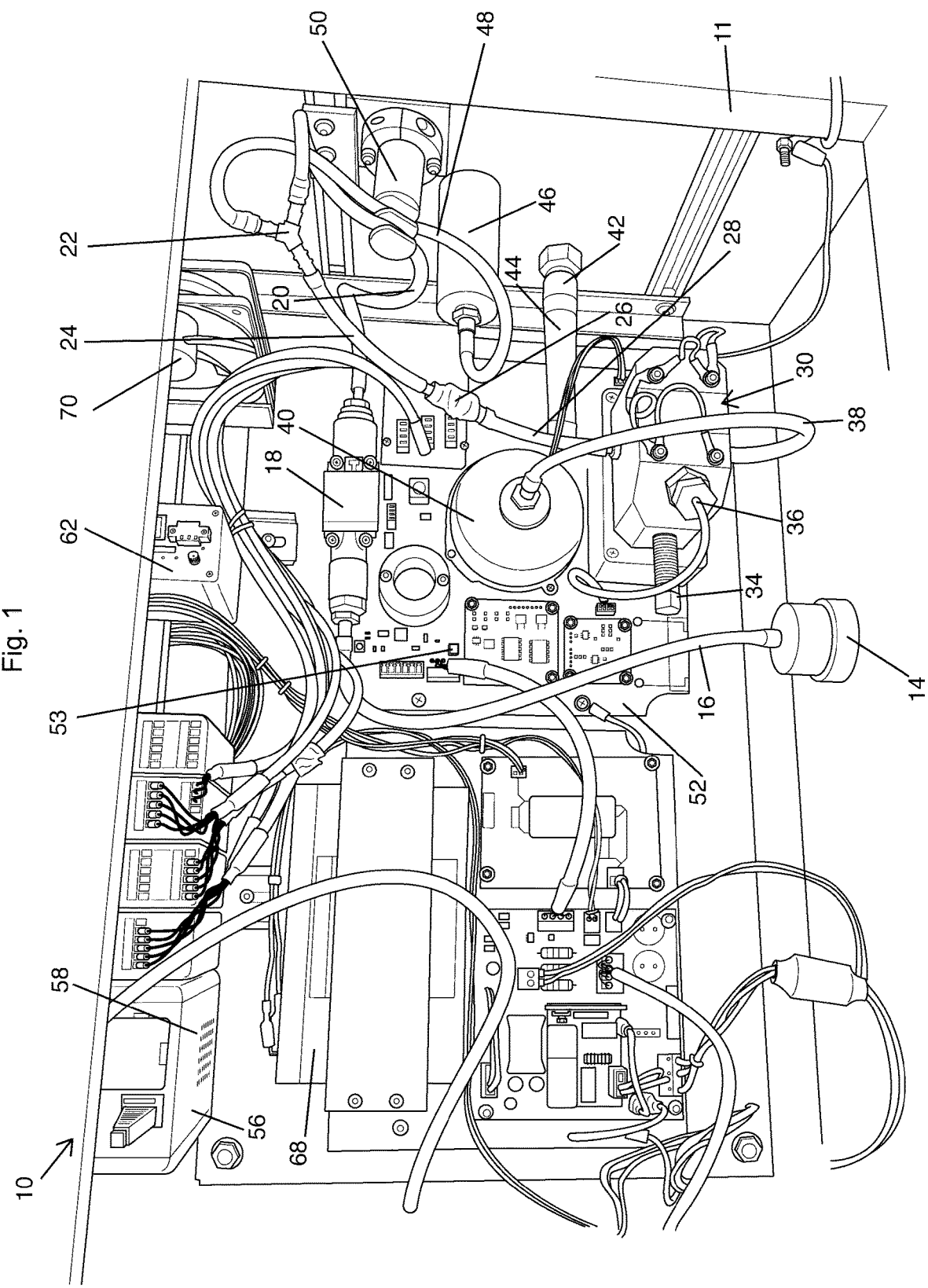
FIG. 1 is an internal view of a particulate matter measuring apparatus according to an embodiment of the present invention.
Figure 2:
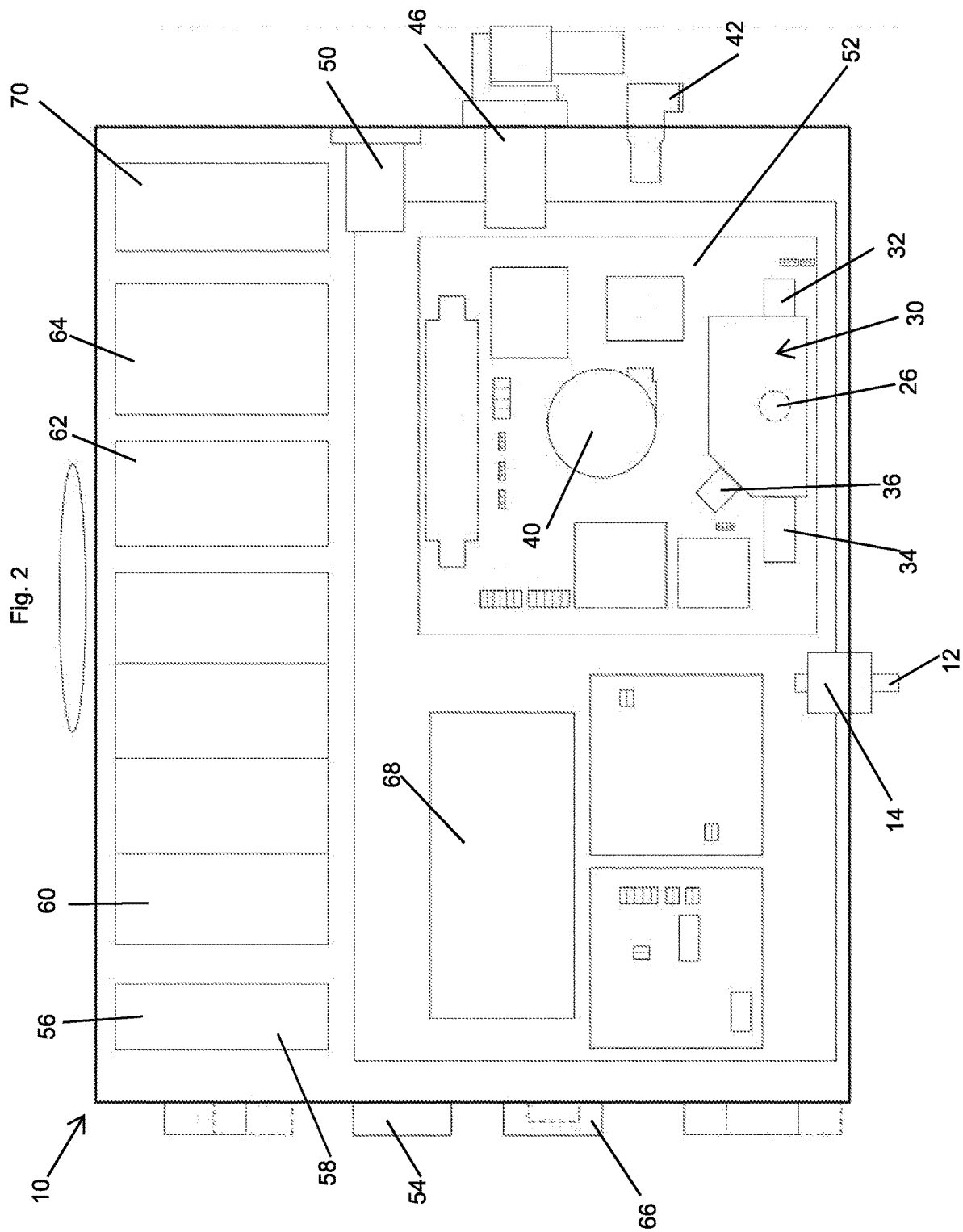
FIG. 2 is a schematic view of the particulate matter measuring apparatus.

With reference to FIGS. 1 and 2 there is shown a particulate matter measuring apparatus in the form of a diesel particulate matter (DPM) measuring apparatus 10 according to an embodiment of the present invention. The DPM measuring apparatus 10 has an inlet 12 (best seen in FIG. 2) through which air to be measured is introduced into the DPM measuring apparatus 10. The inlet 12 is fluidly connected to a cyclone means in the form of a cyclone 14. The cyclone 14 has a cut point of 0.8 μm to remove larger none diesel particulate matter from the air that is to be measured. The cyclone's cut point of 0.8 μm is achieved at an air flow rate of 2.2 L/min.

The cyclone 14 is fluidly connected by tubing 16 (tubing only shown in FIG. 1) to a flow rate sensor 18. The flow rate sensor 18 is adapted to measure the flow rate of the air leaving the cyclone 14. The flow rate sensor 18 is fluidly connected by tubing 20, 'Y' junction 22 and tubing 24 (items 20,22,24 only shown in FIG. 1) to a heater 26. The heater 26 is adapted to heat the air leaving the cyclone 14 to reduce the influence of humidity on the subsequent measurement of diesel particulate matter in the air.

The heater 26 is fluidly connected by tubing 28 (tubing only shown in FIG. 1) to a particle detector in the form of a laser light scattering photometry (LLSP) particle detector 30. The LLSP particle detector 30 has a laser diode 32 (only seen in FIG. 2) to produce laser light. The laser diode 32 produces laser light having a wavelength of 624 nm. The LLSP particle detector 30 has a light trap 34 to 'trap' any laser light that is not scattered by particulate matter in the air. The light trap 34 is on an opposed side of the LLSP particle detector 30 relative to the laser diode 32. The LLSP particle detector 30 has a detector 36 to detect laser light that is scattered by particulate matter in the air. The detector 36 is angled at 135° relative to the direction of the laser light from the laser diode 32. It was found through trial and error and through the application of Mie Theory that the detector 36 being angled at 135° relative to the direction of the laser light from the laser diode 32 gave the best results in regard to detecting laser light scattered by particulate matter in the air.

The LLSP particle detector 30 is fluidly connected by tubing 38 (tubing only shown in FIG. 1) to a pump in the form of a centrifugal vacuum pump 40. The centrifugal vacuum pump 40 can be controlled to vary the flow rate of the air through the cyclone 14 and the LLSP particle detector 30, dependent on a reading of the flow rate sensor 18. The centrifugal vacuum pump 40 is fluidly connected to an exhaust in the form of a one-way exhaust valve 42 by tubing 44 (tubing only shown in FIG. 1), such that the air that has passed through the centrifugal vacuum pump 40 can be exhausted to a location outside of the DPM measuring apparatus 10.

The DPM measuring apparatus 10 has a filter 46 for introducing filtered air into the DPM measuring apparatus 10. The filter 46 is a two stage, sintered metal and borosilicate glass fibre filter that can filter out particles larger than 10 nm in air that the filter 46 introduces from outside of the DPM measuring apparatus 10. The filter 46 is fluidly connected to the 'Y' junction 22 by tubing 48 (items 22, 28 only shown in FIG. 1).

A regulator in the form of a pinch valve 50 alternates between air from the cyclone 14 being supplied to the LLSP particle detector 30 or filtered air from the filter 46 being supplied to the LLSP particle detector 30. The pinch valve 50 alternates between the air and the filtered air by pinching and releasing tubing 48 and 20 as required.

It was found through trial and error that the tubing 16,20,24,28,38,48 performed best when it had an internal diameter of 4.3 mm.

The DPM measuring apparatus 10 has a control board 52, which includes a CPU (not shown) which controls the centrifugal vacuum pump 40, the LLSP particle detector 30 (i.e. the laser diode 32), the heater 26 and the pinch valve 50. The CPU also monitors the flow rate sensor 18 and the detector 36.

The DPM measuring apparatus 10 has a pressure sensor 53 which measures the pressure within a casing 11 of the DPM measuring apparatus 10. The detected pressure from the pressure sensor 53 is used to correct the amount of detected particulate matter in the air. This allows the DPM measuring apparatus 10 to provide accurate particulate matter readings in low and high pressure environments. The DPM measuring apparatus 10 has a pressure relief valve (not shown) which equalises the pressure between the inside and outside of the casing 11.

The DPM measuring apparatus 10 has communication devices, which include a USB port 54, Ethernet port 56, wifi modem 58, cellular modem 60, radio transceiver 62 and a Red lion SX data station 64. The communication devices 54,56,58,60,62,64 enable the DPM measuring apparatus 10 to communicate with a remote server (not shown), this enables the remote server to control the DPM measuring apparatus 10 and to monitor measurements taken by the DPM measuring apparatus 10.

The DPM measuring apparatus 10 has a mains connection 66 and a battery 68 to provide power to the DPM measuring apparatus 10. It will be appreciated that if mains electricity is not available or interrupted, the battery 68 can power the DPM measuring apparatus 10. The DPM measuring apparatus 10 has a fan 70 to cool the electronic devices (eg 52,54,56,58,60,62,64).

In use, with reference to FIGS. 1 and 2, initially the pinch valve 50 is in a position where it pinches tubing 48 and 'releases' tubing 20. The centrifugal vacuum pump 40, the heater and the laser diode are turned on by the control board 52. The pump 40 moves the air from the inlet 12 through the cyclone 14, through the flow rate sensor 18, through the heater 26, through the LLSP particle detector 30 and exhausts the air through the one-way exhaust valve 42 to outside the DPM measuring apparatus 10.

The pressure sensor 53 measures the pressure within the casing 11. The measured pressure is saved by the control board 52.

The cyclone 14 removes particles larger than 0.8 μm from the air which passes through it. Once the flow rate is at the desired rate of 2.2 L/min as measured by the flow rate sensor 18 and once the air is heated to the desired temperature of 56° C., the detector 36 is turned on to detect the amount of laser light from the laser diode 32 that is scattered by particulate matter in the air. The detector 36 measures the amount of scattered laser light for a predetermined number of readings, for example 20 readings. The particulate matter measurement is saved as a cumulative value by the control board 52.

After the detector 36 has measured the amount of laser light from the laser diode 32 that is scattered by particulate matter in the air, the pinch valve 'releases tubing 48 and pinches tubing 20. Now the centrifugal vacuum pump 40 is moving filtered air from the filter 46 through the heater 26, through the LLSP particle detector 30 and exhausts the filtered air through the one-way exhaust valve 42 to outside the DPM measuring apparatus 10. The detector 36 now measures the amount of laser light from the laser diode 32 that is scattered by the filtered air for a predetermined number of readings, for example 20 readings. The filtered air measurement 'zero' value is saved as a cumulative value by the control board 52. The centrifugal vacuum pump 40, the heater, the laser diode and the detector 36 are turned off by the control board 52 once the filtered air has been measured for the 20 readings.

The control board 52 calculates the difference between the 'zero' value and the particulate matter measurement. This takes into account any noise that may be generated by the LLSP particle detector 30 (for example noise as a result of variations in the air, or particulate matter stuck to a lens of the laser diode 32 or the detector 36) and provides a more accurate measurement of the amount of particulate matter in the air compared to measurements that do not incorporate a 'zero' measurement, or measurements that utilize infrequent and/or manually taken 'zero' measurements. The control board 52 also takes into account the measured pressure and uses this to provide a more accurate measurement of the amount of particulate matter in the air by adjusting the measurement accordingly. The calculated difference (i.e. more accurate measurement of the amount of particulate matter in the air) is communicated via one of the communication devices 54,56,58,60,62,64 to a remote server (not shown) so that it can be displayed to a user or trigger another action such as triggering an alert if the amount of particulate matter in the air exceeds a predetermined amount, adjusting ventilation fans, controlling flow control devices and/or limiting access to contaminated areas.

The control board 52 starts a timer to count down to a next sampling period, where the process described above is repeated. The timer is typically user defined and may be in the range of 2-5 minutes to provide continuous monitoring of the amount of particulate matter in the air.

Figure 3:
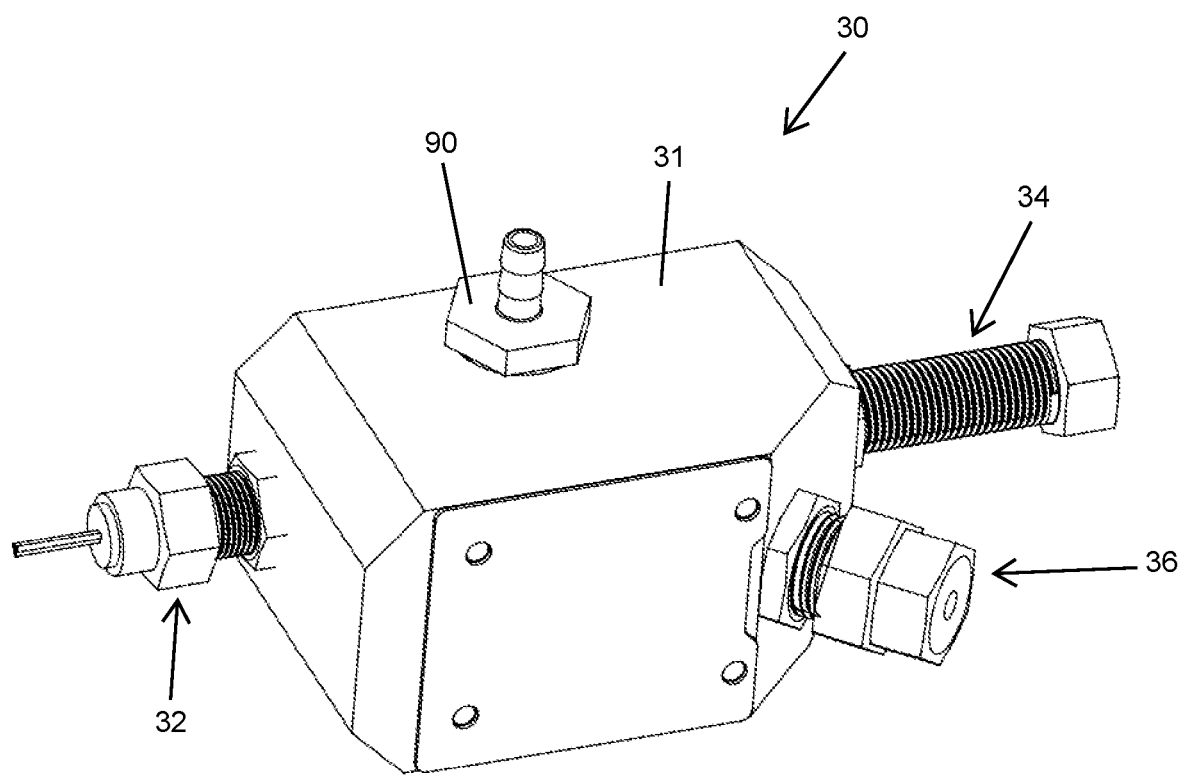
FIG. 3 is a perspective view of a laser light scattering photometry particle detector.
Figure 4:
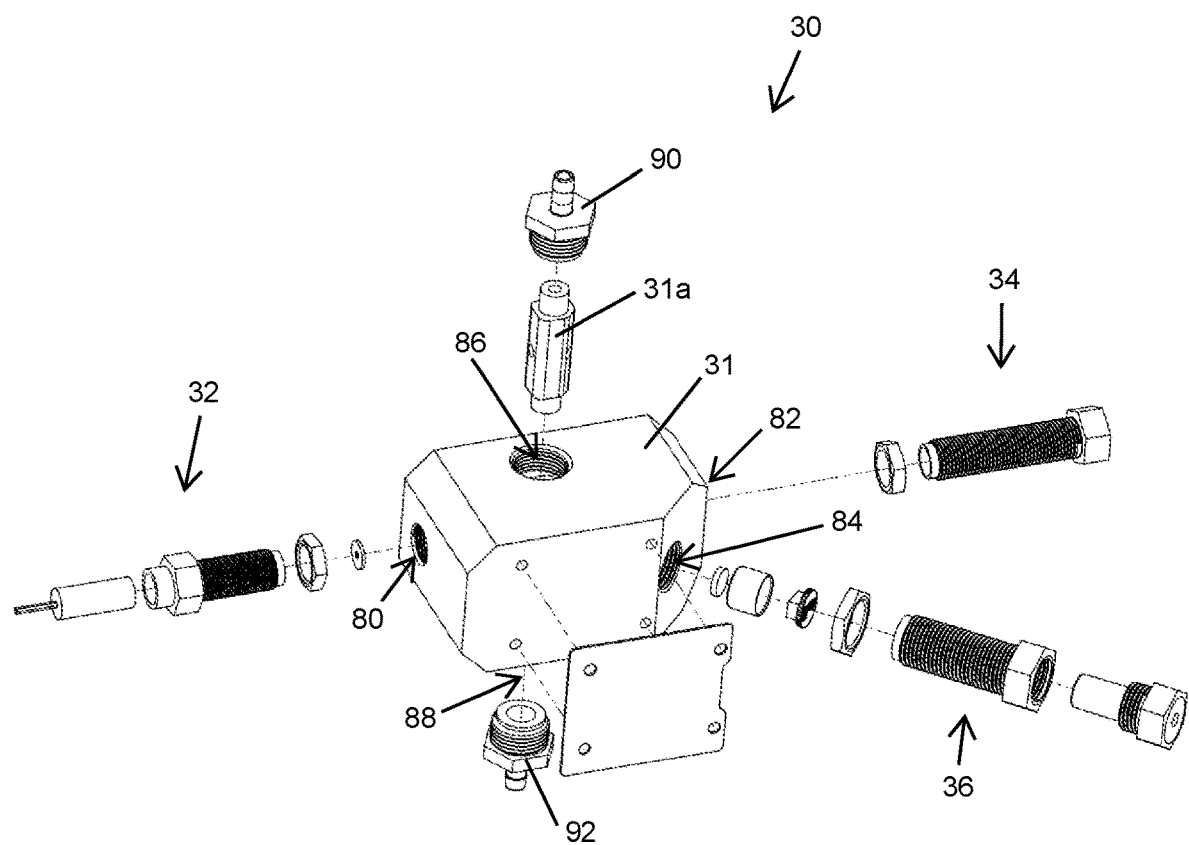
FIG. 4 is an exploded view of the laser light scattering photometry particle detector of FIG. 3.
Figure 5:
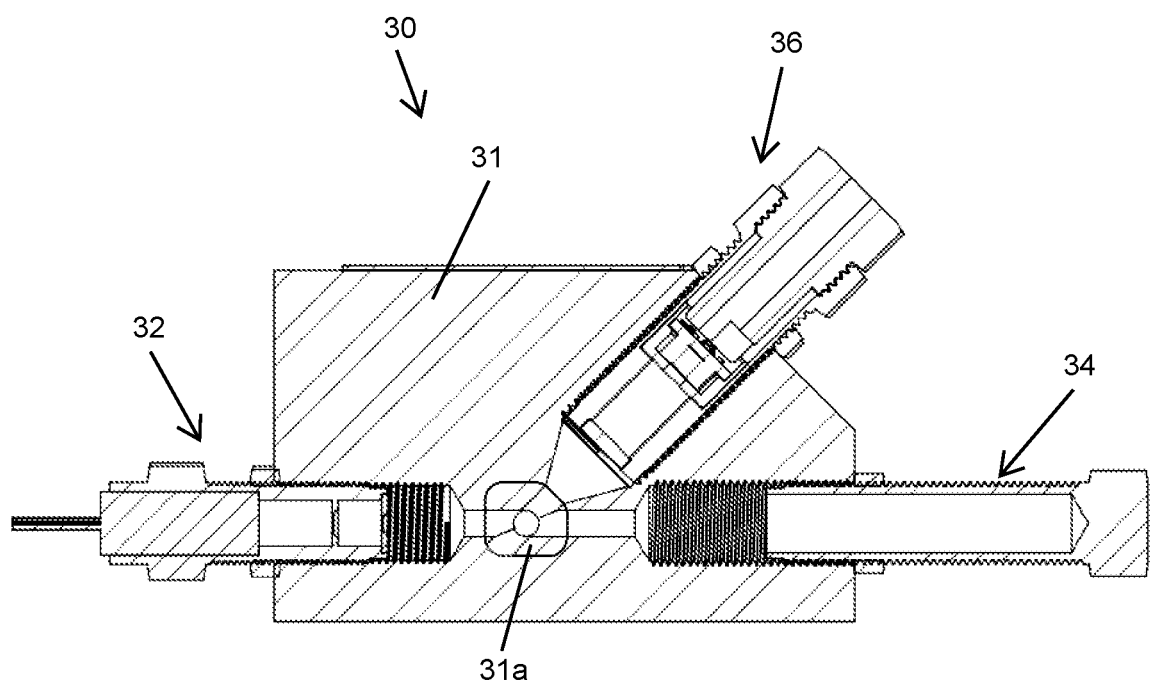
FIG. 5 is a sectioned view of the laser light scattering photometry particle detector of FIG. 3.

With reference to FIGS. 3, 4 and 5, there is shown a LLSP particle detector 30 according to an embodiment of the present invention. The LLSP particle detector 30 has a main body 31 and a laser chamber 31*a*. The laser chamber 31*a* is held in position within the main body 31 by tube connectors 90 and 92. Tube connectors 90 and 92 have a threaded portion which engage with threaded apertures 86 and 88 in the main body 31.

The LLSP particle detector 30 also has a laser diode 32. The laser diode 32 has a threaded portion that engages with threaded aperture 80. The LLSP particle detector 30 also has a light trap 34 to 'trap' any laser light that is not scattered by particulate matter in the air. The light trap 34 has a threaded portion to engage with threaded aperture 82.

The light trap 34 has carbon dust applied to an inside surface to inhibit any reflection of laser light.

The LLSP particle detector 30 also has a detector 36 that is angled at 135° relative to the direction of the laser light from the laser diode 32. The detector 36 is also angled at 90° relative to the direction of air flow through the LLSP particle detector 30. The detector 36 has a threaded portion to engage with threaded aperture 84.

Having threaded portions on the tube connectors 90,92, the laser diode 32, the light trap 34 and the detector 36 engage with threaded apertures 86, 88, 80, 82 and 84 respectively restricts unwanted light from entering the laser chamber 31*a*.

ADVANTAGES

The advantages of the preferred embodiment of the particulate matter measuring apparatus include continuous monitoring of the amount of particulate matter in the air with minimal maintenance, and greater accuracy compared to prior art devices that do not incorporate a 'zero' measurement, or utilize infrequent and/or manually taken 'zero' measurements.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

What is claimed:

1. A particulate matter measuring apparatus including:
   an inlet for introducing air;
   a cyclone means fluidly connected to the inlet, the cyclone means adapted to remove particles of a predetermined size from the air;
   a particle detector to detect particulate matter in the air; and
   a pump to move the air from the inlet, through the cyclone means and through the particle detector,
   wherein the particle detector has a laser diode to shine laser light through the air and a detector angled at between 115° to 140° relative to the direction of the laser light to detect an amount of laser light scattered by particulate matter in the air.

2. The apparatus of claim 1, wherein the particle detector has a light trap to trap any laser light that is not scattered by particulate matter.

3. The apparatus of claim 1, wherein the cyclone means is adapted to remove particles greater than 0.8 μm from the air.

4. The apparatus of claim 1, wherein the detector and the laser diode are angled at substantially 90° relative to an axis extending in the direction of the flow of air through the particle detector.

5. The apparatus of claim 1, further including a filter for introducing filtered air and a regulator to regulate the air and the filtered air entering the particle detector.

6. The apparatus of claim 5, wherein the regulator is adapted to alternate between the air and the filtered air.

7. The apparatus of claim 1, wherein the detector is angled at substantially 135° relative to the direction of the laser light.

8. The apparatus of claim 1, wherein the laser light used in the particle detector has a wavelength of 624 nm.

9. The apparatus of claim 1, wherein the cyclone means has a dust cup for collection of the particles of a predetermined size that have been removed from the air.

10. The apparatus of claim 1, further including
    a casing;
    a pressure relief valve in fluid communication with an area inside of the casing and an area outside of the casing to equalise the pressure between the outside of the casing and the inside of the casing; and
    a pressure sensor to detect the pressure within the casing.

11. A method of measuring particulate matter in air, the method including the steps of:
    introducing air into a particulate matter measuring apparatus, said particulate matter measuring apparatus includes a cyclone means and a particle detector;
    removing particles of a predetermined size from the air using the cyclone means; and
    detecting particulate matter in the air after it has left the cyclone means by using a particle detector, involving shinning a laser light through the air as it is flowing through the particle detector; and
    detecting the scattered laser light at between 115° to 140° relative to an axis extending in the direction of the laser light.

12. The method of claim 11, wherein the step of removing particles of a predetermined size from the air using a cyclone means involves removing particles larger than 0.8 μm.

13. The method of claim 11, wherein the step of detecting the scattered laser light further involves detecting the scattered laser light at substantially 90° relative to an axis extending in the direction of the flow of air.

14. The method of claim 11, wherein the step of detecting particulate matter in the air after it has left the cyclone means by using a particle detector involves detecting the particulate matter at predetermined intervals and for predetermined time periods.

15. The method of claim 11, further including the steps of
introducing filtered air into the particulate matter measuring apparatus;
moving the filtered air through the particle detector to produce a 'zero' reading; and
utilising the 'zero' reading to correct the amount of detected particulate matter in the air.

16. The method of claim 15, further including the step of controlling a valve to select between air leaving the cyclone means and filtered air.

17. The method of claim 11, further including the step of varying the flow rate of the air to remove at least some of the particles of a predetermined size from the cyclone means.

18. The method of claim 11, further including the step of communicating an amount of detected particulate matter to a remote server.

19. The method of claim 11, further including the step of trapping the laser light that is not scattered in a light trap.

20. The method of claim 11, further including the steps of
moving the air through the cyclone means and through the particle detector using a pump;
controlling the pump to achieve a predetermined flow rate of the air of between 0.5 and 3 L/min.

21. The method of claim 11, further includes the step of measuring the pressure within a casing of the particulate matter measuring apparatus and using the measured pressure to correct the amount of detected particulate matter in the air.

22. The method of claim 11, wherein the step of detecting the scattered laser light involves detecting the scattered laser light at substantially 135° relative to the axis extending in the direction of the laser light.

23. The apparatus of claim 1, wherein the particulate matter measuring apparatus is a diesel particulate matter measuring apparatus.

* * * * *